United States Patent [19]

Bruns et al.

[11] Patent Number: 5,830,818
[45] Date of Patent: Nov. 3, 1998

[54] PROCESS FOR THE MICROWAVE BENEFICIATION OF DISCOLORED KAOLIN CLAY MATERIALS

[75] Inventors: Jeffrey C. Bruns; Jessica E. Kogel, both of Augusta; Susan A. Lewis, Sandersville, all of Ga.

[73] Assignee: Thiele Kaolin Company, Sandersville, Ga.

[21] Appl. No.: 839,036

[22] Filed: Apr. 23, 1997

[51] Int. Cl.$^6$ .................. B03B 1/02; B03B 1/04; B03B 5/00; C09C 1/42
[52] U.S. Cl. .................. 501/141; 501/146; 106/486; 106/488; 423/118.1; 423/132; 209/10; 209/11
[58] Field of Search ..................... 106/486, 488, 106/487; 501/146, 141; 423/118.1, 132; 209/10, 11

[56] References Cited

U.S. PATENT DOCUMENTS

| | | | |
|---|---|---|---|
| 3,371,988 | 3/1968 | Maynard et al. | 501/146 |
| 3,850,653 | 11/1974 | Zentz, Jr. | 501/146 |
| 4,088,732 | 5/1978 | Maynard et al. | 501/146 |
| 4,615,869 | 10/1986 | Kremer et al. | 501/146 |
| 5,266,539 | 11/1993 | Passariello | 106/488 |
| 5,376,605 | 12/1994 | Iannicelli et al. | 501/146 |
| 5,545,599 | 8/1996 | Pickering, Jr. et al. | |
| 5,603,411 | 2/1997 | Williams et al. | 106/488 |
| 5,685,899 | 11/1997 | Norris et al. | 106/487 |
| 5,685,900 | 11/1997 | Yuan et al. | 106/488 |

OTHER PUBLICATIONS

Francombe et al.; *Structure Transformations Effected by the Dehydration of Diaspore, Goethite and Delta Ferric Oxide*; Clay Minerals Bulletin; vol. 4; pp. 1–14 Aug. 1959.

Schwertmann et al.; *Iron Substitution in Soil and Synthetic Anatase*; 1995; Clay & Clay Minerals; vol. 43; pp. 599–606 (no month).

*Primary Examiner*—Michael Marcheschi
*Attorney, Agent, or Firm*—Jones & Askew, LLP

[57] ABSTRACT

Kaolin clay materials containing discoloring impurities can be beneficiated by microwave irradiation in the presence of water and a polyprotic acid component to produce a beneficiated kaolin clay material having improved color and brightness.

12 Claims, No Drawings

PROCESS FOR THE MICROWAVE BENEFICIATION OF DISCOLORED KAOLIN CLAY MATERIALS

TECHNICAL FIELD

This invention relates to the beneficiation of kaolin clay materials. In a more specific aspect, this invention relates to the use of microwave irradiation in the beneficiation of discolored kaolin clay materials. This invention also relates to the beneficiated kaolin clay materials produced by the process of this invention.

This invention will be described with specific reference to discolored kaolin clays, as beneficiated kaolin clays are very important and useful materials. However, this application should be understood as applicable to other discolored kaolin clay materials, with these other materials being derived from the processing of kaolin clays. Specific examples of these other discolored kaolin clay materials are crude kaolin clays, the paramagnetic mineral fractions derived from high intensity magnetic separation of kaolin clays, the froth components derived from the froth flotation of kaolin clays, and the impurity fractions derived from the selective flocculation of kaolin clays. Therefore, although especially useful in regard to discolored kaolin clays, this invention is also useful in regard to other discolored kaolin clay materials. Consequently, the term "discolored kaolin clay materials" is used in a broad sense in this application.

BACKGROUND OF THE INVENTION

Kaolin is a naturally occurring, relatively fine, white clay which may be generally described as a hydrated aluminum silicate. After purification and beneficiation, kaolin clay is widely used as a filler and pigment in various materials, such as rubber and resins, and in various coatings, such as paints and coatings for paper.

Two types of clay are mined in Georgia. One type is referred to as soft kaolin. This clay type occurs in Cretaceous age strata and is, in general, characterized by a low total iron content, low total titanium content, relatively coarse particle size and well-ordered crystallites.

The second type is referred to as hard kaolin. This clay type occurs in Tertiary age strata and contains more iron and titanium than the soft kaolins. Not only do the hard kaolin clays contain more iron than the soft kaolins, but this excess iron is found in the kaolinite structure. Another distinguishing feature is that the hard kaolin clays have a relatively fine particle size. Both the hard and soft kaolins can contain goethite which causes a yellow discoloration.

The use of kaolin clay in paper coatings serves, for example, to improve the color, brightness, gloss, smoothness, printability and opacity of the coated paper. Opacity in such paper coatings is enhanced by the light scattering ability of the kaolin clay, and such ability can be estimated by the scattering coefficient as described in TAPPI, 1978, Vol. 51, No. 6, pages 78–80.

Color is a very important parameter when beneficiating kaolin clays because a colorless finished product is desirable. Low grade, crude, discolored kaolin clays are frequently found which do not respond well to conventional beneficiation processes and thus are not selected for further processing. Because the quality of kaolin reserves in Georgia is decreasing as high quality deposits are mined, beneficiation processes are needed which can render previously unusable crude kaolins useful as pigments.

To be of commercial value, a kaolin clay must have certain desirable optical properties either in its natural state or as a beneficiated product. These properties include brightness, which is a measure of the amount of light reflected, and color which, is generally measured using the Hunter L-, a-, and b-value system.

In the Hunter system, L-value provides a measure of lightness where whiteness is positive and blackness is negative, a-value provides a measure of redness where redness is positive and greenness is negative and b-value provides a measure of yellowness where yellowness is positive and blueness is negative. In general, for paper coating applications, higher brightness clays are most desirable. As far as color is concerned, clay products having high L-, low a- and low b-values are most desirable.

A significant factor in the discoloration of kaolin is the presence of trace amounts of iron and titanium which are present as accessory minerals and which are incorporated into the kaolinite structure. One impurity which is frequently found in discolored kaolins, but which does not respond well to conventional processing, is the mineral goethite, which is chemically iron oxide-hydroxide (FeOOH).

Another discoloring impurity found in kaolin is an iron-substituted titanium dioxide mineral in which the discoloration is due to the development of a heteronuclear interval-ence charge transfer between titanium and iron ions in the crystal lattice. Because both goethite and iron-substituted titanium dioxide have absorption bands in the visible region of the spectrum, they appear discolored, generally yellow to reddish yellow, and thus are problematic to the production of a white or colorless kaolin pigment.

These discoloring impurity minerals can be removed by various conventional beneficiation processes, including high intensity magnetic separation, reductive leaching, selective flocculation and froth flotation. Instead of removing these minerals, an alternative approach to improving kaolin color involves the conversion of these minerals to other phases. Well-known examples of mineral conversion include the thermal conversion of yellow goethite to pink hematite (M. H. Francombe and H. P. Rooksby, "Structure Transformations Effected by the Dehydration of Diaspore, Goethite, and Delta Ferric Oxide", *Clay Minerals Bulletin*, 1959, Vol. 4, pages 1–14); the thermal conversion of yellow-colored Fe-substituted anatase to white pseudobrookite, $Fe_2TiO_5$ (U. Schwertmann, J. Fiedl, G. Pfab and U. Gehring, "Iron Substitution in Soil and Synthetic Anatase", *Clays and Clay Minerals*, 1995, Vol. 43, pages 599–606); and the conversion of chlorite to kaolinite (U.S. Pat. No. 5,545,599). As indicated, the mineral conversion processes utilize heating.

An alternative to heating is the introduction of microwave energy into a material. As is well known, molecules which possess a permanent dipole moment will absorb microwave energy and be excited to a higher energy level. The molecule may dispose of this excess energy by the following pathways—(1) transformation of the excitation into a vibrational mode (i.e., heat), (2) dissociation of the molecule to simpler molecules or atoms or (3) production of an excited intermediate which undergoes further reactions with other molecules. Pathways 2 and 3 can occur with conventional heating.

Injection of microwave energy into a material is an effective way to excite compounds which have an absorptive cross section for the particular microwave frequency used. Microwave irradiation is non-ionizing and impacts molecular rotation and ion migration. The production of heat in a material undergoing microwave irradiation is a secondary process whereby excitations decay by crossing from a rotational molecular excitation to a vibrational excitation (i.e., heat). A material which is microwave transparent, such as TEFLON® or silica, does not undergo any heating as a result of irradiation by microwave photons.

Pure kaolinite is expected to be microwave transparent, due to the lack of any permanent dipole moment. By contrast, a material which possesses a microwave absorption cross section (one which has a dipole moment) will heat under irradiation, provided there is no alternate pathway for the material to lose the excitation energy gained by absorption of the microwave photons. Therefore, from a molecular standpoint, microwave irradiation is completely different than conventional heating of a material.

A need exists in the kaolin clay industry for an alternative process by which kaolin clay materials, which may not be useful in certain paper coating applications because of discoloration, can be rendered useful for such applications.

SUMMARY OF THE INVENTION

Briefly described, the present invention provides a process for the beneficiation of kaolin clay materials by which the kaolin clay materials are rendered useful for those applications where certain color and brightness characteristics are desired.

This invention also provides a kaolin clay product which, when compared to the starting material, has improved brightness and color after microwave irradiation according to the process of this invention.

Accordingly, an object of this invention is to provide a process for the beneficiation of kaolin clay materials.

Another object of this invention is to provide a process for the beneficiation of kaolin clay materials in which the kaolin clay materials are subjected to microwave irradiation in the presence of a polyprotic acid during beneficiation.

Another object of this invention is to provide a process for the beneficiation of kaolin clay materials in which the beneficiated kaolin clay material has improved brightness and color when compared to the starting material.

Another object of this invention is to provide a process for the beneficiation of kaolin clay materials in which the beneficiated kaolin clay material is useful in applications where certain brightness and color characteristics are desired.

Still another object of this invention is to provide a kaolin clay material which has been subjected to microwave irradiation in the presence of a polyprotic acid during beneficiation.

Still another object of this invention is to provide a beneficiated kaolin clay material which has improved brightness and color when compared to the starting material.

Still another object of this invention is to provide a beneficiated kaolin clay material which is useful in applications where certain brightness and color characteristics are desired.

These and other objects, features and advantages of this invention will become apparent from the following detailed description.

DETAILED DESCRIPTION OF THE INVENTION

In accordance with the present invention, a kaolin clay material, which may not be useful in certain paper coating applications due to the presence of discolorants, is beneficiated by a process which subjects the material to microwave irradiation in the presence of water and a polyprotic acid component. The resultant beneficiated kaolin clay material has improved brightness and color when compared to the starting kaolin clay material.

More specifically, the process of this invention comprises the following sequential steps:

Obtaining a starting kaolin clay material; subjecting the starting material to microwave irradiation in the presence of water and a polyprotic acid component, wherein the irradiation continues until a total microwave flux of 1–225 (preferably 2.8–28.5) kilowatt-seconds per gram (KWS/g) of starting material is achieved; and washing the irradiated material to produce a beneficiated kaolin clay material, whereby the color and brightness of the beneficiated material are improved as compared to the starting material.

The novel beneficiated kaolin clay material produced by the process of this invention can be used effectively in applications where color and brightness are desired product characteristics, such as in paper coating applications. By the process of this invention, previously unusable kaolin clay materials can be beneficiated to provide useful products.

In the process of this invention, a polyprotic acid component is employed in combination with the microwave irradiation. Examples of suitable polyprotic acid components are phosphoric, sulfuric, boric, periodic, selenic, sulfurous, pyrophosphoric, antimonious and hydrosulfuric acids and mixtures thereof.

We have found that the process of this invention is effective when the polyprotic acid component is present in the range of 0.1–1.0 ml acid per gram of starting material. A preferred range is 0.3–0.8 ml acid per gram of starting material.

The microwave irradiation which is used to treat the starting kaolin clay material in this invention can be provided by the use of standard commercial microwave equipment.

While the exact mechanism of the change in color and brightness of the kaolin clay material is unknown, we believe the changes are due to conversion of the goethite and/or iron substituted anatase to a material which does not have the same absorption characteristics in the visible region of the spectrum. Analysis of phosphoric acid treated samples by X-ray diffraction does not indicate either the formation of any new mineral phases or the destruction of the kaolinite. Analysis by Fourier transform infrared spectroscopy (FTIR) confirms this observation. Electron micrographs indicate that the material still appears morphologically as kaolinite, and there is no sign of agglomeration or structuring. Chemical analysis by X-ray flourescence spectroscopy (XRF) indicates the presence of phosphate; however, the concentration is below the level added to the samples for the process.

We first believed that the reaction which occurs is the conversion of goethite to iron phosphate ($FePO_4$); however, such a phase could not be identified by X-ray diffraction. Given that the reaction will also occur with sulfuric acid, the mineral phase which is being formed may be an iron titanium oxide, such as pseudo-brookite $Fe_2TiO_5$ or a similar phase produced by alteration of the iron contaminated titanium dioxide present in the kaolin clay material. This is consistent with the observed behavior of the product, which visually appears more gray than the starting material.

The present invention is further illustrated by the following examples which are illustrative of certain embodiments designed to teach those of ordinary skill in the art how to practice this invention and to represent the best mode contemplated for practicing this invention.

EXAMPLES 1–3

Slurries prepared from both soft and hard Georgia kaolin clays are screened to remove residue (>44 μm), oven-dried and pulverized. Five grams of the screened crude are weighed into a TEFLON® beaker. Using water, a slurry of 25% solids is made. Concentrated phosphoric acid is added in a ratio of 1 ml acid per gram of clay. The beaker containing the mixture is placed in the carousel of a laboratory grade microwave and exposed to 114 KWS of microwave energy. The irradiated clay is washed, dried and pulverized.

The GE brightness values of the beneficiated product are measured following standard TAPPI procedure (T6460M-94). As understood by those having skill in this art, the Hunter system L-, a- and b-values are measured using the standard TAPPI procedure T6460M-94, but using equipment described in standard TAPPI procedure T5240M-94. These results (before and after beneficiation) are listed in Table 1.

TABLE 1

| Example | GE Brightness (Before/After) | Hunter L-value (Before/After) | Hunter a-value (Before/After) | Hunter b-value (Before/After) |
| --- | --- | --- | --- | --- |
| 1 | 69.4/82.0 | 91.7/94.5 | 0.51/0.26 | 11.7/5.89 |
| 2 | 80.0/87.4 | 94.4/95.6 | 0.13/0.40 | 7.25/3.33 |
| 3 | 80.5/83.5 | 94.5/94.7 | 0.04/0.04 | 6.90/5.00 |

EXAMPLES 4–6

Slurries prepared from both soft and hard Georgia kaolin clays are screened to remove residue (>44 μm), oven-dried and pulverized. Five grams of the screened crude are weighed into a TEFLON® beaker. Using water, a slurry of 25% solids is made. Concentrated sulfuric acid is added in a ratio of 1 ml acid per 1 g clay. The beaker containing the mixture is placed in the carousel of a laboratory grade microwave and exposed to 114 KWS of microwave energy. The irradiated clay is washed, dried and pulverized.

The GE brightness values and the Hunter L-, a- and b-values are measured as described in Examples 1–3. The results are listed in Table 2.

TABLE 2

| Example | GE Brightness (Before/After) | Hunter L-value (Before/After) | Hunter a-value (Before/After) | Hunter b-value (Before/After) |
| --- | --- | --- | --- | --- |
| 4 | 69.4/80.5 | 91.7/94.0 | 0.51/0.42 | 11.7/6.21 |
| 5 | 80.0/86.4 | 94.4/95.1 | 0.13/0.40 | 7.25/3.39 |
| 6 | 80.5/82.5 | 94.5/95.3 | 0.04/0.05 | 6.90/5.20 |

This invention has been described in detail with particular reference to certain embodiments, but variations and modifications can be made without departing from the spirit and scope of the invention as defined in the following claims.

What is claimed is:

1. A process for beneficiation of kaolin clay materials, wherein the process comprises the sequential steps of:

A. subjecting a starting kaolin clay material to microwave irradiation in the presence of water and a polyprotic acid component, wherein the irradiation continues until a microwave flux of 1–225 kilowatt-seconds per gram of starting material is achieved; and B. washing the irradiated material to produce a beneficiated kaolin clay material, whereby the color and brightness of the beneficiated material are improved as compared to the starting material.

2. A process as defined by claim 1 wherein the polyprotic acid component is phosphoric, sulfuric, boric, periodic, selenic, sulfurous, pyrophosphoric, antimonious, or hydrosulfuric acid or mixtures thereof.

3. A process as defined by claim 2 wherein the polyprotic acid component is phosphoric acid.

4. A process as defined by claim 2 wherein the polyprotic acid component is sulfuric acid.

5. A process as defined by claim 1 wherein the amount of polyprotic acid component is from 0.1–1.0 ml per gram of starting material.

6. A process as defined by claim 1 wherein the irradiation continues until a microwave flux of 2.8–28.5 kilowatt-seconds per gram of starting material is achieved.

7. A microwave beneficiated kaolin clay material produced by a process which comprises the sequential steps of:

A. subjecting a starting kaolin clay material to microwave irradiation in the presence of water and a polyprotic acid component, wherein the irradiation continues until a microwave flux of 2.8–28.5 kilowatt-seconds per gram of starting material is achieved; and B. washing the irradiated material to produce a beneficiated kaolin clay material, whereby the color and brightness of the beneficiated material are improved as compared to the starting material.

8. A kaolin clay material as defined by claim 7 wherein the polyprotic acid component is phosphoric, sulfuric, boric, periodic, selenic, sulfurous, pyrophosphoric, antimonious, or hydrosulfuric acid or mixtures thereof.

9. A kaolin clay material as defined by claim 8 wherein the polyprotic acid component is phosphoric acid.

10. A kaolin clay material as defined by claim 8 wherein the polyprotic acid component is sulfuric acid.

11. A kaolin clay material as defined by claim 7 wherein the amount of polyprotic acid component is from 0.1–1.0 ml per gram of starting material.

12. A kaolin clay material as defined by claim 7 wherein the irradiation continues until a microwave flux of 2.8–28.5 kilowatt-seconds per gram of starting material is achieved.

* * * * *